United States Patent Office 3,416,500
Patented Dec. 17, 1968

3,416,500
METHOD AND SYSTEM FOR DETECTING LEAKS IN A FORCED THROUGH FLOW STEAM GENERATOR PLANT
Donald E. A. Lyons, Simsbury, Conn., assignor to Combustion Engineering, Inc., Windsor, Conn., a corporation of Delaware
Filed Dec. 28, 1966, Ser. No. 605,408
3 Claims. (Cl. 122—406)

ABSTRACT OF THE DISCLOSURE

A system receiving input signals from a multiplicity of detection stations, which signals constitute measurements of actual flow, temperature and conductivity of the working fluid at an established steam load, and which are compared with normal predetermined values. A deviation from normal values results in an output signal from the comparison, indicating for example, boiler tube leak, location of water wall leak, feedwater heater leak, and condenser leak.

Background of the invention

The invention relates to a steam generating power plant equipped with a forced through flow steam generator in which the working fluid circulates in a substantially closed cycle from the feedwater source through the steam generator to the steam turbine and condenser and back to the feedwater source. The invention more specifically relates to a system designed to automatically detect leakage of the working fluid from the various components of the steam power circuit, and to immediately warn the operator if such leakage occurs.

Leak detection in the cycle of forced through flow steam boilers is presently often based on guesswork and a few uncoordinated comparisons. In the past, early information as to a leak in the boiler tubes could only be obtained by an alert operator listening to unusual noises coming from the furnace. However, most large modern boilers are of the pressurized furnace type which prevents the operator from obtaining this knowledge by listening. This is primarily due to the fact that any openings such as furnace doors in the wall of a pressurized furnace are equipped with air jets, which prevent gas leakage from the furnace when the door is opened, but which also prevents the operator from being aware of any unusual noises such as those indicating a ruptured tube.

Since most modern steam power plants are operated remotely whether they are of the pressurized or suction type of furnace, the lack of constant physical surveillance makes the herein disclosed leak detecting system necessary on either type.

Tremendous damage can be inflicted by a leak of the working fluid if this leak is not immediately discovered. Such damage is especially costly if the leak occurs in the tubular heating surface of the steam boiler such as in the furnace wall tubes, or superheater tubes. Because of the high level of noise generally surrounding the operating furnace of a large steam generator and the limited visibility of the furnace interior afforded the operator, a tube fracture may escape detection for a considerable time until the high temperature steam escaping at extremely high velocity through the fracture of the tube has succeeded in the cutting of several neighboring tubes, thereby multiplying the original leak at an alarming rate. In one recent installation the fracture of one single tube caused the rupture of 19 other tubes and severe damage to additional tubes before the leak was discovered and the furnace could be shut down.

Summary of the invention

A primary object of the invention is to provide a leak detecting system which rapidly alerts the operating personnel to the hazards to equipment and life resulting from tube failure. The system requires the integration of flow, temperature, and conductivity measurements. Important elements of the system are several detection stations established at critical locations and receiving input signals indicating the actual flow, temperature and conductivity of the working fluid at these points in the flow path and for each steam load. The system accepts these signals for program analysis by a computer or other instrumentation and compares these signals with signals representing normal desired set values at the given steam load. All functions in the program analysis are basic and proven. The output signal resulting from a differentiation between the actual measured values and the normal desired values indicates to the operator the presence of a leak and the location of the leak in the cycle. In the case of a water wall tube failure, the exact wall section is further defined by thermocouple indication.

Description of the preferred embodiment

Figure 1:
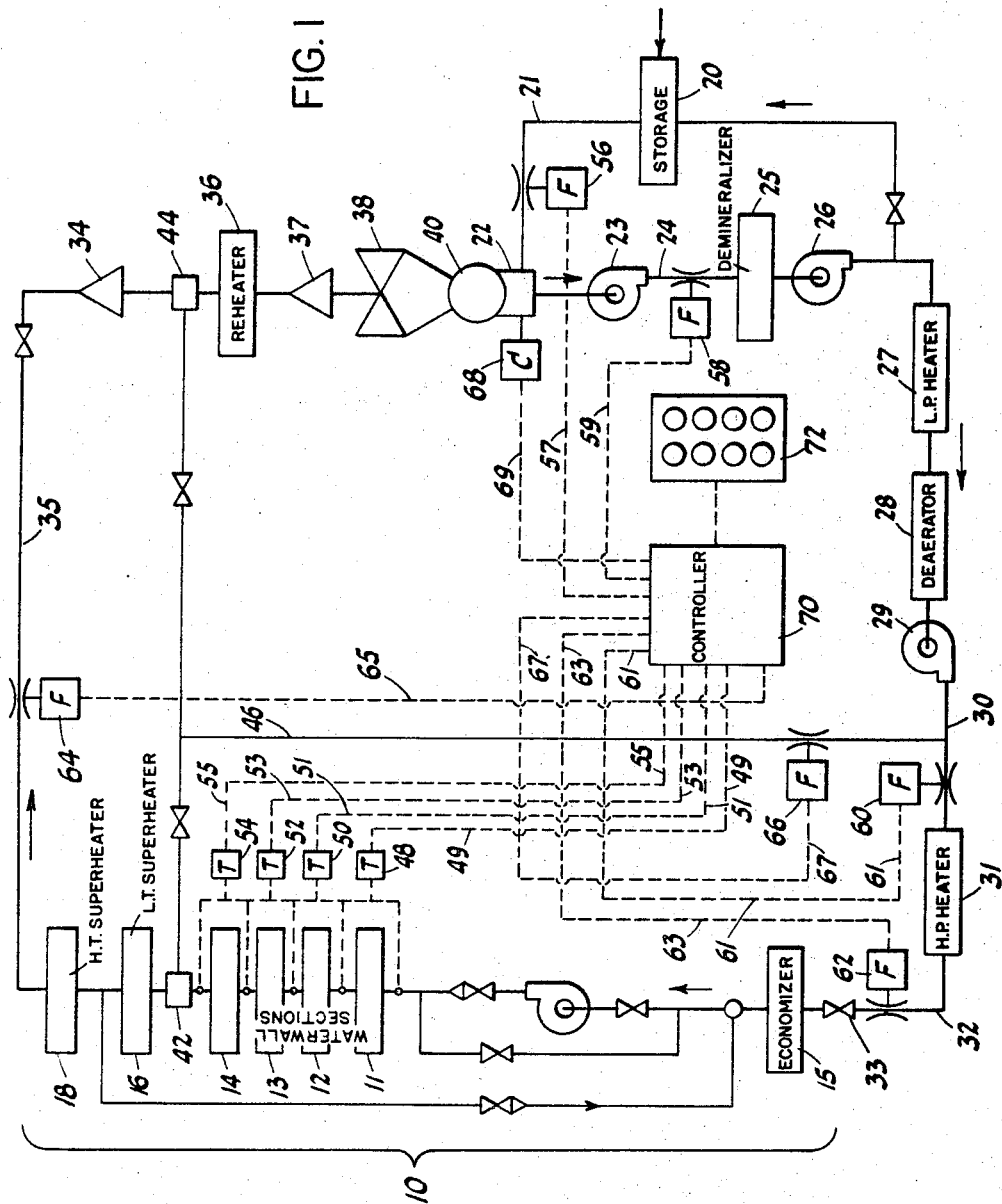
FIGURE 1 is a flow diagram of a forced through flow steam generating power plant to which the herein disclosed leak detecting system is applied.

Referring now to the drawings wherein like reference characters are used throughout to designate like elements, the illustrative and preferred embodiment depicted in FIG. 1 includes a steam generator of the forced through flow type generally designated as 10 and comprising an economizer 12; first, second, third, and fourth furnace water wall sections 11, 12, 13, and 14, respectively; a low temperature superheater 16; and a high temperature superheater 18. The steam generator 10 receives feedwater from a make-up water storage tank 20 by way of make-up water line 21, condenser hot well 22, hot well pump 23, conduit 24, demineralizer 25, condensate booster pump 26, low pressure feedwater heater 27, deaerator 28, boiler feed pump 29, conduit 30, high pressure feedwater heater 31, conduit 32, and feedwater valve 33. The steam generated and superheated in generator 10 is conducted to a high pressure turbine 34 by way of steam conduit 35, then to a reheater 36, an intermediate pressure turbine 37, a low pressure turbine 38, and a condenser 40, with the condensate being collected in hot well 22. Desuperheaters 42 and 44, respectively, are provided to control the temperature of the steam entering low temperature superheater 16 and reheater 36 by spray water which is supplied by way of conduit 46 from the main feedwater conduit 30. Temperature measuring devices generally designated T are shown to measure the difference between the temperature of the working fluid entering and leaving water wall sections 11 through 14. Sections 11 through 14 may represent either entire furnace walls or individual tube panels. Thus numerals 48, 50, 52, and 54, respectively, designate the temperature measuring devices indicating the temperature rise of the working fluid flowing through water wall sections 11, 12, 13, and 14. Other thermocouples (not shown) could be installed for measuring the steam temperature entering and leaving superheat section 16 and 18 for the purpose of locating leaks in these sections.

Flow measuring devices generally designated F are provided to indicate the actual flow of the working medium through critical portions of the fluid cycle. Thus flow indicating device 56 measures the flow of the make-up water in conduit 21, device 58 the flow leaving hot well pump 23. Flow indicating device 60 measures the flow entering and flow indicating device 62 the flow leaving high pressure feedwater heater 31, flow indicator 64 the steam flow to turbine 34, and flow meter 66 measures the flow of the spray water to desuperheaters 42 and 44.

Conductivity meter generally designated C and given the numeral 68 determines the conductivity of the mixture and make-up water in hot well 22.

While I have shown eleven critical points in the flow path of the working medium for measuring the temperature rise, flow and conductivity, it may be desirable to determine flow, temperature rise, and conductivity at other or additional points in the fluid cycle to assure early knowledge of leakage of the working fluid.

The signals indicating actual temperature rise, actual flow and actual conductivity are transmitted to a controller 70 by conduits 49, 51, 53, 55; 57, 59, 61, 63, 65, 67; and 69, respectively, where these signals are automatically compared with predetermined and corresponding signals representing normal temperature rise and normal flow and conductivity. An output signal representing the result of this comparison is transmitted from controller 70 to indicator 72. If the actual values differentiate measurably from the normal values, a visual, oral, or other indication emitted by indicator 72 warns the operator of leakage in the working fluid cycle, with information where the leakage is occurring.

Figure 2:
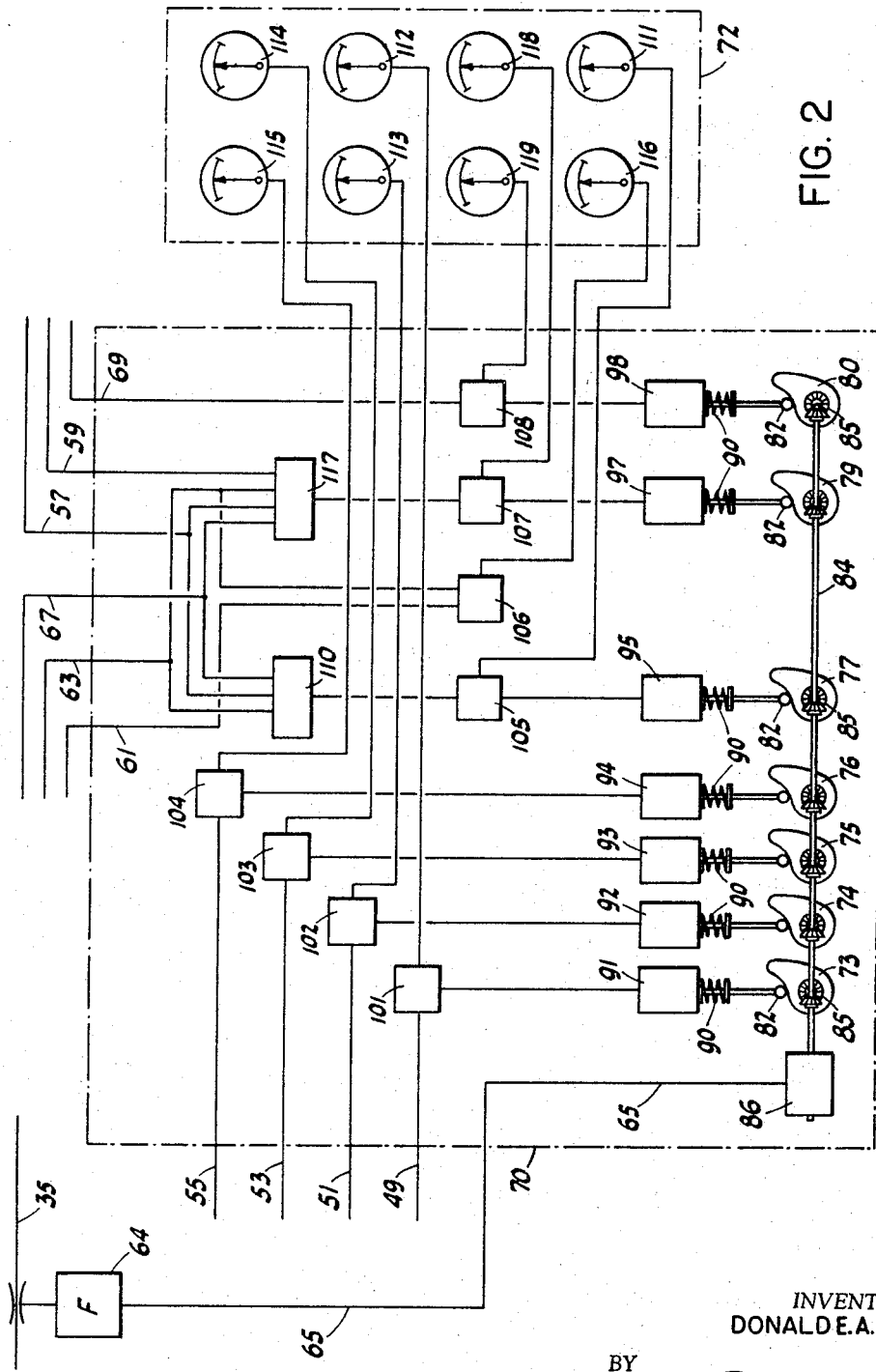
FIGURE 2 is a detail of the controller receiving and comparing signals of actual values and signals of desired values, and emitting output signals to a leakage indicator.

Referring now to FIG. 2, controller 70 includes a pluarality of cams 73, 74, 75, 76, 77, 78, 79, and 80. Each of these cams has a contour which for each load raises or lowers a cooperating follower 82 so that this follower assumes a position which corresponds to the desired normal value of a respective temperature rise, flow, or conductivity. The position of the cams and the followers is determined by the position of rotation of a common shaft 84 which position is transmitted to cams 73 through 80 by pairs of gears 85. An activating device 86 also mounted on shaft 84 is controlled by signals received through conduit 65, which signals are representative of the steam flow or load of the steam generator as measured by flow meter 64. Other signals which indicate load may be used such as turbine output.

The position of the follower 82 while being urged against the contour of cams 73 through 80 by a suitable device such as spring 90, establishes for each steam load in each set point receiver 91, 92, 93, 94, 95, 96, 97, and 98 a corresponding standard normal control condition or set point. Impulses of these set point or normal expected values are then transmitted to differentiating devices 101, 102, 103, 104, 105, 106, 107, and 108, where they are compared with actual measured values received from the temperature measuring stations 48, 50, 52, and 54, the flow measuring stations 56, 58, 60, 62, and 66, and the conductivity measuring station 68.

The set point values established in receivers 91, 92, 93, and 94 are normal expected temperature rises in wall sections 11, 12, 13, and 14, and at the same steam load correspond to the actual values determined in differentiating devices 48, 50, 52, and 54, respectively. The set point value established in receiver 98 is a normal expected conductivity value of the fluid in the hot well 22 which at the same steam load corresponds to the actual value measured at station 68. On the other hand, the set point values established in receivers 95 and 97 are relationships between certain normal flow values expected to occur at points 56, 58, 62, and 66 and which would correspond to the same relationships of actual flow values at these points for a given steam load.

Thus to determine a possible leak in the furnace wall tubes 11, 12, 13, and 14, a ratio is established between the sum of the feedwater flow at 62 and the spray flow quantity at 66, and the flow of make-up water at 56, which ratio is a constant for each specific steam load. The normal expected set value of this ratio is incorporated in the contour of cam 77, is received by receiver 95 for each steam load, and is then compared in differentiating device 105 with the same ratio of actual flow values. This actual ratio is computed in computing device 110 from the actual flow values received from flow measuring stations 62, 66, and 56. If the result of the comparison as transmitted to indicator 111 shows a higher than normal ratio, then leakage must occur in the fluid cycle downstream of station 62.

Such leakage is most likely to occur in the furnace wall tubes. To determine the specific wall section that contains the ruptured tube, indicators 112, 113, 114, and 115 are consulted which receive impulses from differentiating devices 101, 102, 103, and 104. Thus if comparison of the actual temperature rise values at any of the stations 11, 12, 13, and 14 with the desired normal values received from receivers 91, 92, 93, and 94 shows that the temperature rise is higher in a particular water wall section than expected, then the indicator of the particular section warns the operator that it contains a ruptured tube.

To determine a possible leak in the high pressure feedwater heater 31, the feedwater flow at a station 62 is compared with the flow at station 60 in differentiating device 106. If the result of such comparison as transmitted to indicating device 116 shows that outgoing flow at 62 is less than the incoming flow at 60, leakage in high pressure feedwater heater 31 is indicated.

To determine a possible leak in the condenser 40, the sum of the feedwater flow at station 62 and the spray water flow at station 66 is compared with the condensate flow from the hot well 22 as measured at station 58 minus the make-up flow measured at station 56. This comparison results in a ratio which is computed in computing device 117 and is a constant for each specific steam flow rate. The actual value of this ratio as computed in computing device 117 from actual flow measurements is transmitted to comparing device 107 where it is compared with the normal expected ratio value based on normal expected flows as received from receiver 97. If the result of this comparison as transmitted to indicator 118 has a value greater than the normal value, a signal emitted from indicator 118 alerts the operator that condenser in-leakage is taking place.

To reconfirm possible in-leakage to the condenser, impulses of actual conductivity readings taken in station 68 are compared in differentiating device 108 with the normal desired conductivity readings as obtained from receiver 98. If the result of this comparison as transmitted to indicator 119 shows a higher value than the normal expected value, then in-leakage of much higher dissolved concentration than normally experienced is indicated.

While I have described hereinabove instrumentation for practicing my invention that is more or less of the mechanical kind, it is understood that an electronic computer could also with great benefit be employed in connection with the herein disclosed leak detection system.

From the above it can be readily appreciated that the invention offers a superior and novel system of leak detection which by coordinating actual values of temperature rise, flow, and conductivity taken at critical measuring stations in the fluid flow path and comparing these with normal expected values, rapidly alerts the operating personnel of the presence and location of leaks in the fluid flow cycle.

While I have illustrated and described a preferred embodiment of my invention, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:

1. A system for detecting leaks in the flow path of the working fluid cycle of a forced through-flow steam power plant operating over a wide steam load range, and said flow path comprising conduit means including serially connected heat exchange elements and furnace tubes, means for flowing working fluid through said flow path, a desuperheater, a piepeline connected to said flow path conduit for flowing spray water to said desuperheater, a condenser hot well, and a make-up water line connected to said hot well for delivering made-up water thereto; the improvement which comprises measuring means for determining the actual value of a property of the working fluid indicative of the flow rate thereof at a given steam load and at selected points in said path between said elements, means for determining the normal desired value of said property at said given steam load, means for determining the difference between said actual and said desired value, and means for emitting an output signal if said determined difference exceeds a predetermined safe value; said measuring means comprising a first flow indicating device in said flow path conduit upstream of said furnace tubes but downstream of said pipeline, a second flow indicating device in said pipeline, and a third flow indicating device in said make-up water line; and means for determining said property as the ratio between the sum of the flow indicated by said first and said second devices and the flow indicated by said third device.

2. A system according to claim 1, which additionally includes a demineralizer in said flow path downstream of said hot well, measuring means comprising a fourth flow indicating device in said flow path conduit between said hot well and said demineralizer; and means for determining said property as the difference of the flows indicated by said fourth and said third devices.

3. A system for detecting leaks in the flow path of the working fluid cycle of a forced through-flow steam power plant operating over a wide steam load range, said flow path comprising conduit means including serially connected heat exchange elements, means for flowing working fluid through said flow path, a condenser hot well, a make-up water line connected to said hot well for delivering make-up water thereto, and a demineralizer in said flow path downstream of said hot well, the improvement which comprises measuring means for determining the actual value of a property of the working fluid said measuring means comprising a conductivity indicating device connected to said flow path conduit means at a point in said flow path between said make-up water connection and said demineralizer, means for determining said property as an indication of said device of the impurities concentration in the working fluid present in said hot well, means for determining the normal desired value of said property at said given steam load, means for determining the difference between said actual value and said desired value, and means for emitting an output signal if said determined difference exceeds a predetermined safe value.

References Cited

UNITED STATES PATENTS 3,202,136   8/1965   Hottenstine.
3,244,898   4/1966   Hicox _____ 122—448 X

FOREIGN PATENTS 809,287   2/1959   Great Britain.

CHARLES J. MYHRE, *Primary Examiner.*